(12) United States Patent
Zhang (10) Patent No.: US 11,606,227 B2
(45) Date of Patent: Mar. 14, 2023

(54) BEAM SELECTION METHOD AND APPARATUS, AND STORAGE MEDIUM

(71) Applicant: Huawei Technologies Co., Ltd., Shenzhen (CN)

(72) Inventor: Pengcheng Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 17/131,307

(22) Filed: Dec. 22, 2020

(65) Prior Publication Data

US 2021/0111928 A1    Apr. 15, 2021

Related U.S. Application Data

(63) Continuation of application No. PCT/CN2019/093232, filed on Jun. 27, 2019.

(30) Foreign Application Priority Data

Jun. 28, 2018    (CN) .......................... 201810689743.2

(51) Int. Cl.
*H04B 17/336*  (2015.01)
*H04B 7/0408*  (2017.01)
*H04B 7/06*  (2006.01)
*H04L 5/00*  (2006.01)
*H04L 25/02*  (2006.01)

(52) U.S. Cl.
CPC ....... *H04L 25/0224* (2013.01); *H04B 7/0408* (2013.01); *H04B 7/0617* (2013.01); *H04B 17/336* (2015.01); *H04L 5/0048* (2013.01)

(58) Field of Classification Search
CPC ................ H04B 7/0408; H04B 7/0617; H04B 7/0695; H04B 7/088; H04B 17/336; H04L 5/0048; H04L 25/0204; H04L 25/0224

See application file for complete search history.

(56) References Cited

U.S. PATENT DOCUMENTS

| | | | |
|---|---|---|---|
| 2009/0253380 A1 | 10/2009 | Ko et al. | |
| 2011/0182375 A1* | 7/2011 | Kim ................. | H04W 72/0426 375/260 |
| 2016/0211899 A1 | 7/2016 | Yang et al. | |
| 2017/0034795 A1* | 2/2017 | Madan ................ | H04W 52/243 |

FOREIGN PATENT DOCUMENTS

| | | |
|---|---|---|
| CN | 103875271 A | 6/2014 |
| CN | 104904064 A | 9/2015 |
| CN | 105790913 A | 7/2016 |
| CN | 107172625 A | 9/2017 |
| CN | 107306162 A | 10/2017 |
| CN | 107635189 A | 1/2018 |
| CN | 108092701 A | 5/2018 |
| WO | 2017131811 A1 | 8/2017 |

* cited by examiner

*Primary Examiner* — David B Lugo
(74) *Attorney, Agent, or Firm* — Slater Matsil, LLP (57) ABSTRACT

This application provides a beam selection method and apparatus, and a storage medium. The method includes: separately measuring a sounding reference signal SRS sent by at least one terminal, to determine a first spectral efficiency of each terminal; calculating a second spectral efficiency of each beam group based on the first spectral efficiency of each terminal, where each beam group includes at least one beam, and each beam covers at least one terminal; and determining a target beam group based on the second spectral efficiency of each beam group.

20 Claims, 3 Drawing Sheets

Separately measure an SRS sent by at least one terminal, and determine a first spectral efficiency of each terminal — 101

Calculate a second spectral efficiency of each beam group based on the first spectral efficiency of each terminal, where each beam group includes at least one beam, and each beam covers at least one terminal — 102

Determine a target beam group based on the second spectral efficiency of each beam group — 103

BEAM SELECTION METHOD AND APPARATUS, AND STORAGE MEDIUM

CROSS-REFERENCE TO RELATED APPLICATIONS

This application is a continuation of International Application No. PCT/CN2019/093232, filed on Jun. 27, 2019, which claims priority to Chinese Patent Application No. 201810689743.2, filed on Jun. 28, 2018. The disclosures of the aforementioned applications are hereby incorporated by reference in their entireties.

TECHNICAL FIELD

Embodiments of this application relate to the field of communications technologies, and in particular, to a beam selection method and apparatus, and a storage medium.

BACKGROUND

As mobile broadband (MBB) develops and a quantity of users increases, a network capacity increasingly becomes a bottleneck of development of a mobile communications system (Universal Mobile Telecommunications System, UMTS). A common way of expanding the network capacity is mainly to add a spectrum, add a site, add a multi-sector networking, or use a multi-beam antenna.

In the prior art, when a multi-beam antenna is used for expanding the network capacity, a quantity of tunnels of a primary device are usually increased, to increase partitions of a service information channel in a vertical dimension, thereby improving spectrum efficiency and further improving the network capacity.

However, due to impact of an antenna azimuth of a base station, base station planning, and user distribution in a split multi-cell, a loss of split gains is caused, thereby affecting an effect of network capacity expansion.

SUMMARY

This application provides a beam selection method and apparatus, and a storage medium, so that an optimal coverage beam group can be determined, thereby increasing a split gain, improving a network capacity expansion effect, and improving an overall coverage effect.

According to a first aspect, an embodiment of this application provides a beam selection method, including: separately measuring a sounding reference signal SRS sent by at least one terminal, to determine a first spectral efficiency of each terminal; calculating a second spectral efficiency of each beam group based on the first spectral efficiency of each terminal, where each beam group includes at least one beam, and each beam covers at least one terminal; and determining a target beam group based on the second spectral efficiency of each beam group.

In the foregoing solution, the at least one terminal includes a terminal in a local cell, a terminal in a neighboring site, a terminal at an edge of a neighboring cell, or the like. After measuring the SRS, a network device determines the first spectral efficiency of each terminal, and calculates the second spectral efficiency of each beam group based on the first spectral efficiency, to determine the target beam group. In this way, the network device can determine inter-cell interference based on the second spectral efficiency of each beam group, so that an optimal coverage beam group can be determined, thereby increasing a split gain, improving a network capacity expansion effect, and improving an overall coverage effect.

In a possible implementation, the separately measuring a sounding reference signal SRS sent by at least one terminal, to determine a first spectral efficiency of each terminal includes: separately measuring the SRS sent by each terminal in a local cell, to determine an equivalent channel response that is of each first beam and that corresponds to the local cell; calculating a power level of each first beam based on the equivalent channel response of each first beam; and determining the first spectral efficiency of each terminal in the local cell based on the power level of each first beam.

In a possible implementation, the determining the first spectral efficiency of each terminal in the local cell based on the power level of each first beam includes: separately determining a serving beam and an interference beam of each terminal in the local cell; calculating a signal to interference plus noise ratio SINR of each terminal in the local cell based on the serving beam and the interference beam; and determining the first spectral efficiency of each terminal in the local cell based on each SINR.

In the foregoing solution, after calculating the power levels of the first beams, the network device selects a beam with a largest power level as the serving beam of the terminal, and uses another beam as the interference beam of the terminal. After the serving beam and the interference beam of the terminal are determined, the SINR is calculated, and the first spectral efficiency of the terminal is calculated according to the calculated SINR and a Shannon formula or a demodulation threshold table.

In a possible implementation, the calculating a second spectral efficiency of each beam group based on the first spectral efficiency of each terminal includes: counting a quantity of terminals covered by each first beam in each beam group; and calculating the second spectral efficiency $KE\Lambda\Lambda$ of each beam group according to a formula $$KE\Lambda\Lambda = \sum_{i=0}^{M-1} \sum_{k=0}^{N^i-1} \frac{se(k)}{N^i}$$

or a formula $$KE\Lambda\Lambda = \sum_{i=0}^{M-1} \left( \frac{1}{N^i} \sum_{k=0}^{N^i-1} se(k) \right),$$

where $se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, and i is a positive integer greater than or equal to 0 and less than M−1.

In a possible implementation, the calculating a second spectral efficiency of each beam group based on the first spectral efficiency of each terminal includes: counting a quantity of terminals covered by each first beam in each beam group; determining a second beam covering a largest quantity of terminals in each beam group, and obtaining a quantity of terminals covered by the second beam; and calculating the second spectral efficiency $KE\Lambda\Lambda$ of each beam group according to a formula $$KE\Lambda\Lambda = \frac{\sum_{i=0}^{M-1}\sum_{k=0}^{N^i-1} se(k)}{N^x},$$

where se(k) is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, i is a positive integer greater than or equal to 0 and less than M, and $N^x$ is the quantity of terminals covered by the second beam.

In a possible implementation, the determining a target beam group based on the second spectral efficiency of each beam group includes: determining distribution information of terminals covered by each beam group; selecting at least one first beam group whose distribution information falls within a preset range; and determining, as the target beam group, a second beam group that has a largest second spectral efficiency and that is in the at least one first beam group.

Gains of downlink coverage beams may be evaluated based on a measurement result of an uplink SRS. Therefore, multiple beams can be adjusted, to improve spectral efficiency gains in a multi-beam coverage scenario.

In a possible implementation, the determining a target beam group based on the second spectral efficiency of each beam group includes: sorting the second spectral efficiencies of the beam groups in descending order, and selecting first p beam groups as the target beam group, where p is a positive integer; or determining a beam group whose second spectral efficiency is greater than a first preset threshold as the target beam group.

In this solution, after determining the second spectral efficiencies of the beam groups in the foregoing manner, the network device compares the second spectral efficiencies of the beam groups, sorts the second spectral efficiencies in descending order, and selects the first p beam groups with a relatively high second spectral efficiency as the target beam group, where the p target beam groups are a beam group with optimal coverage.

In addition, the network device may alternatively determine the beam group whose second spectral efficiency is greater than the first preset threshold as the target beam group.

In this application, based on channel reciprocity, multi-beam levels of uplink reference channels of a plurality of terminals are measured, and multi-beam level values are processed based on a given grouping relationship, to obtain a mutual interference level between multiple beams in each group, a spectral efficiency in a scenario of multi-beam spatial multiplexing, a user distribution proportion among the multiple beams, inter-site or inter-cell interference, and the like. Therefore, the beam group with optimal downlink coverage is determined based on the information, thereby improving the overall coverage effect.

In a possible implementation, the separately measuring the SRS sent by each terminal in a local cell, to determine an equivalent channel response that is of each first beam and that corresponds to the local cell includes: determining the equivalent channel response of each first beam according to a formula $$\begin{bmatrix} \vec{H}^0 \\ \vdots \\ \vec{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix}, \text{ where } \begin{bmatrix} H_0 \\ \vdots \\ H_{P-1} \end{bmatrix}$$

is a received channel response of P physical channels, $$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

is weights of multiple beams, $w_p^m$ indicates a weight coefficient of a first beam m on a channel p, $$[w_0^m \;\; \cdots \;\; w_{P-1}^m]$$

is a weight vector of the first beam m on a used channel, and $$\begin{bmatrix} \vec{H}^0 \\ \vdots \\ \vec{H}^{M-1} \end{bmatrix}$$

indicates the equivalent channel response that is of each first beam and that is obtained through weighted processing.

In a possible implementation, the calculating a power level of each first beam based on the equivalent channel response of each first beam includes: calculating the power level of each first beam according to a formula $$\begin{bmatrix} P^0 \\ \vdots \\ P^{M-1} \end{bmatrix} = 10*\log 10 \left( \begin{bmatrix} \|\vec{H}^0\| \\ \vdots \\ \|\vec{H}^{M-1}\| \end{bmatrix} \right) - E, \text{ where } \|\vec{H}^m\|$$

indicates a norm of an equivalent channel coefficient of the first beam m, $\|\vec{H}^m\| = \Sigma |h|^2$, h is a channel coefficient sequence, E indicates an uplink receive channel gain, 10*log 10( ) indicates a linear-to-logarithm conversion operation, and $p^m$ indicates an equivalent power level of the first beam m.

In a possible implementation, the method further includes: measuring an SRS sent by at least one terminal in a neighboring cell, to determine an equivalent channel response that is of each third beam and that corresponds to the neighboring cell; calculating a power level of each third beam based on the equivalent channel response of each third beam; and determining a third beam with a largest power level, and determining a beam group including the third beam with the largest power level as a non-target beam group, or determining a beam group including a fourth beam with a power level greater than a second preset threshold as a non-target beam group.

In the foregoing solution, after determining the power levels that are of the third beams and that correspond to the neighboring cell, the network device determines the third beam with the largest power level, where the third beam with the largest power level is a third beam with largest interference. In this case, the network device may exclude the beam group including the third beam with the largest power level, to be specific, determine the beam group as a non-target beam group.

The beam group including the third beam with the largest interference is determined as the non-target beam group. In this way, because inter-site or inter-cell interference is considered, a downlink optimal coverage beam group may be determined, thereby improving an overall coverage effect.

In addition, after determining the power levels that are of the third beams and that correspond to the neighboring cell, the network device determines the fourth beam whose power level is greater than the second preset threshold, where the fourth beam whose power level is greater than the second preset threshold is a beam with relatively strong interference. In this case, the network device may exclude the beam group including the fourth beam, to be specific, determine the beam group as a non-target beam group.

The beam group including the fourth beam with the relatively strong interference is determined as the non-target beam group. In this way, because inter-site or inter-cell interference is considered, a downlink optimal coverage beam group may be determined, thereby improving an overall coverage effect.

In a possible implementation, the method further includes: grouping a plurality of first beams based on coverage of the plurality of first beams, to obtain a plurality of beam groups.

In this solution, beams whose beam coverage levels are not greater than a threshold S (for example, 10 dB) may be grouped into one group.

According to a second aspect, an embodiment of this application provides a beam selection apparatus, including: a determining unit, configured to separately measure a sounding reference signal SRS sent by at least one terminal, to determine a first spectral efficiency of each terminal; and a calculation unit, configured to calculate a second spectral efficiency of each beam group based on the first spectral efficiency of each terminal, where each beam group includes at least one beam, and each beam covers at least one terminal, where the determining unit is further configured to determine a target beam group based on the second spectral efficiency of each beam group.

In a possible implementation, the determining unit is specifically configured to: separately measure the SRS sent by each terminal in a local cell, to determine an equivalent channel response that is of each first beam and that corresponds to the local cell; calculate a power level of each first beam based on the equivalent channel response of each first beam; and determine the first spectral efficiency of each terminal in the local cell based on the power level of each first beam.

In a possible implementation, the determining unit is specifically configured to: separately determine a serving beam and an interference beam of each terminal in the local cell; calculate a signal to interference plus noise ratio SINR of each terminal in the local cell based on the serving beam and the interference beam; and determine the first spectral efficiency of each terminal in the local cell based on each SINR.

In a possible implementation, the calculation unit is specifically configured to: count a quantity of terminals covered by each first beam in each beam group; and calculate the second spectral efficiency KEΛΛ of each beam group according to a formula $$KE\Lambda\Lambda = \sum_{i=0}^{M-1} \sum_{k=0}^{N^i-1} \frac{se(k)}{N^i}$$

or a formula $$KE\Lambda\Lambda = \sum_{i=0}^{M-1} \left( \frac{1}{N^i} \sum_{k=0}^{N^i-1} se(k) \right),$$

where $se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, and i is a positive integer greater than or equal to 0 and less than M−1.

In a possible implementation, the calculation unit is specifically configured to: count a quantity of terminals covered by each first beam in each beam group; determine a second beam covering a largest quantity of terminals in each beam group, and obtain a quantity of terminals covered by the second beam; and calculate the second spectral efficiency KEΛΛ of each beam group according to a formula $$KE\Lambda\Lambda = \frac{\sum_{i=0}^{M-1} \sum_{k=0}^{N^i-1} se(k)}{N^x},$$

where $se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, i is a positive integer greater than or equal to 0 and less than M, and $N^x$ is the quantity of terminals covered by the second beam.

In a possible implementation, the determining unit is specifically configured to: determine distribution information of terminals covered by each beam group; select at least one first beam group whose distribution information falls within a preset range; and determine, as the target beam group, a second beam group that has a largest second spectral efficiency and that is in the at least one first beam group.

In a possible implementation, the determining unit is specifically configured to: sort the second spectral efficiencies of the beam groups in descending order, and select first p beam groups as the target beam group, where p is a positive integer; or determine a beam group whose second spectral efficiency is greater than a first preset threshold as the target beam group.

In a possible implementation, the determining unit is specifically configured to: determine the equivalent channel response of each first beam according to a formula $$\begin{bmatrix} \vec{H}^0 \\ \vdots \\ \vec{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix}, \text{ where } \begin{bmatrix} H_0 \\ \vdots \\ H_{P-1} \end{bmatrix}$$

is a received channel response of P physical channels, $$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

weights of multiple beams, $w_p^m$ indicates a weight coefficient of a first beam m on a channel p, $[w_0^m \ldots w_{P-1}^m]$ is a weight vector of the first beam m on a used channel, and $$\begin{bmatrix} \vec{H}^0 \\ \vdots \\ \vec{H}^{M-1} \end{bmatrix}$$

indicates the equivalent channel response that is of each first beam and that is obtained through weighted processing.

In a possible implementation, the calculation unit is specifically configured to: calculate the power level of each first beam according to a formula $$\begin{bmatrix} P^0 \\ \vdots \\ P^{M-1} \end{bmatrix} = 10 * \log 10 \left( \begin{bmatrix} \|\vec{H}^0\| \\ \vdots \\ \|\vec{H}^{M-1}\| \end{bmatrix} \right) - E, \text{ where } \|\vec{H}^m\|$$

indicates a norm of an equivalent channel coefficient of the first beam m, $\|\vec{H}^m\| = \Sigma |h|^2$, h is a channel coefficient sequence, E indicates an uplink receive channel gain, 10*log10( ) indicates a linear-to-logarithm conversion operation, and $P^m$ indicates an equivalent power level of the first beam m.

In a possible implementation, the determining unit is further configured to measure an SRS sent by at least one terminal in a neighboring cell, to determine an equivalent channel response that is of each third beam and that corresponds to the neighboring cell; the calculation unit is further configured to calculate a power level of each third beam based on the equivalent channel response of each third beam; and the determining unit is further configured to: determine a third beam with a largest power level, and determine a beam group including the third beam with the largest power level as a non-target beam group, or determine a beam group including a fourth beam with a power level greater than a second preset threshold as a non-target beam group.

In a possible implementation, the apparatus further includes: a grouping unit, configured to group a plurality of first beams based on coverage of the plurality of first beams, to obtain a plurality of beam groups.

The apparatus according to the second aspect of this application may be a network device, or may be a chip in a network device. The network device or the chip has a function of implementing the beam selection method in any one of the foregoing aspects or the possible implementations of the foregoing aspects. The function may be implemented by hardware, or may be implemented by hardware by executing corresponding software. The hardware or the software includes one or more units corresponding to the foregoing functions.

The network device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the network device includes a storage unit, the storage unit is configured to store a computer-executable instruction, the processing unit is connected to the storage unit, and the processing unit executes the computer-executable instruction stored in the storage unit, so that the network device performs the beam selection method in any one of the foregoing aspects or the possible implementations of the foregoing aspects.

The chip includes a processing unit and a transceiver unit. The processing unit may be a processor, and the transceiver unit may be an input/output interface, a pin, a circuit, or the like on the chip. The processing unit may execute a computer-executable instruction stored in a storage unit, so that the chip performs the beam selection method in any one of the foregoing aspects or the possible implementations of the foregoing aspects. Optionally, the storage unit may be a storage unit (for example, a register or a cache) in the chip; or the storage unit may be a storage unit (for example, a read-only memory (ROM)) that is located outside the chip and that is in the network device, another type of static storage device (for example, a random access memory (RAM)) that can store static information and an instruction, or the like.

The foregoing processor may be a central processing unit (CPU), a microprocessor, or an application-specific integrated circuit (application specific integrated circuit, ASIC), or may be one or more integrated circuits that are configured to control program execution of the beam selection method in any one of the foregoing aspects or the possible implementations of the foregoing aspects.

According to a third aspect, an embodiment of this application further provides a network device. The network device may include a processor and a memory.

The memory is configured to store a program instruction.

The processor is configured to invoke and execute the program instruction stored in the memory, to perform the beam selection method according to any one of the implementations of the first aspect.

According to a fourth aspect, an embodiment of this application further provides a computer-readable storage medium. The computer-readable storage medium stores a computer program, and when the computer program is executed by a processor, the beam selection method according to any one of the implementations of the first aspect is performed.

According to a fifth aspect, an embodiment of this application further provides a computer program product including an instruction. When the computer program product runs on a computer, the computer is enabled to perform the beam selection method according to the first aspect of the embodiments of this application.

According to a sixth aspect, an embodiment of this application further provides a chip. The chip stores a computer program, and when the computer program is executed by a processor, the beam selection method according to the first aspect is performed.

According to the beam selection method and apparatus, and the storage medium that are provided in the embodiments of this application, the network device separately measures a sounding reference signal SRS sent by at least one terminal, to determine a first spectral efficiency of each terminal; calculates a second spectral efficiency of each beam group based on the first spectral efficiency of each terminal, where each beam group includes at least one beam, and each beam covers at least one terminal; and determines a target beam group based on the second spectral efficiency of each beam group. After measuring the SRS, the network device determines the first spectral efficiency of each terminal, and calculates the second spectral efficiency of each beam group based on the first spectral efficiency, to determine the target beam group. In this way, the network device can determine inter-cell interference based on the second spectral efficiency of each beam group, so that an optimal coverage beam group can be determined, thereby increasing a split gain, improving a network capacity expansion effect, and improving an overall coverage effect.

DETAILED DESCRIPTION OF ILLUSTRATIVE EMBODIMENTS

The following describes some terms in this application, to facilitate understanding of a person skilled in the art.

1. The terminal device may be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal may be a station (ST) in a wireless local area network (WLAN), a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, a wearable device, a terminal device in a next generation communications system, for example, a 5th generation (fifth-generation, 5G) communications network, a terminal device in a future evolved public land mobile network (PLMN), a terminal device in a new radio (NR) communications system, or the like.

As an example instead of a limitation, in the embodiments of this application, the terminal may alternatively be a wearable device. The wearable device may also be referred to as a wearable intelligent device, and is a general term for wearable devices that are developed by applying wearable technologies to perform intelligent design on daily wear, for example, glasses, gloves, watches, clothes, and shoes. The wearable device is a portable device that is directly worn on a body or integrated into clothes or an accessory of a user. The wearable device is not only a hardware device, but also a device for implementing a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application functions and need to work with other devices such as smartphones, for example, various smart bands, or smart jewelry for physical sign monitoring.

2. The network device may be a device configured to communicate with a mobile device. The network device may be an access point (AP) in a WLAN system, a base transceiver station (BTS) in a GSM or CDMA system, a nodeB (NB) in a WCDMA system, an evolved NodeB (evolutional node B, eNB or eNodeB) in an LTE system, a relay station or an access point, a vehicle-mounted device, a wearable device, a network device in a future 5G network or a network device in a future evolved PLMN network, a next-generation base station (new generation node B, gNodeB) in an NR system, or the like.

3. The unit in this application is a functional unit or a logical unit. The unit may be in a form of software, and a processor executes program code to implement a function of the unit; or the unit may be in a form of hardware.

4. The term "plurality of" indicates two or more, and another quantifier is similar to the term "plurality of". The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. A range described in "above", "below", or the like includes boundary points.

A person skilled in the art may understand that the beam selection method according to the embodiments of this application may be applied to a multi-antenna base station system, and in particular, applied to the way of selecting a beam group with optimal downlink coverage.

In the prior art, when a multi-beam antenna is used for expanding the network capacity, a quantity of tunnels of a primary device are usually increased, to increase partitions of a service information channel in a vertical dimension, thereby improving spectrum efficiency and further improving the network capacity. However, due to impact of an antenna azimuth of a base station, base station planning, and user distribution in a split multi-cell, a loss of split gains is caused, thereby affecting an effect of network capacity expansion.

In view of these cases, a beam selection method is provided in an embodiment of this application. In the method, a network device separately measures a sounding reference signal (SRS) sent by at least one terminal, to determine a first spectral efficiency of each terminal; calculates a second spectral efficiency of each beam group based on the first spectral efficiency of each terminal, where each beam group includes at least one beam, and each beam covers at least one terminal; and determines a target beam group based on the second spectral efficiency of each beam group. After measuring the SRS, the network device determines the first spectral efficiency of each terminal, and calculates the second spectral efficiency of each beam group based on the first spectral efficiency, to determine the target beam group. In this way, the network device can determine inter-cell interference based on the second spectral efficiency of each beam group, so that an optimal coverage beam group can be determined, thereby increasing a split gain, improving a network capacity expansion effect, and improving an overall coverage effect.

Figure 1:
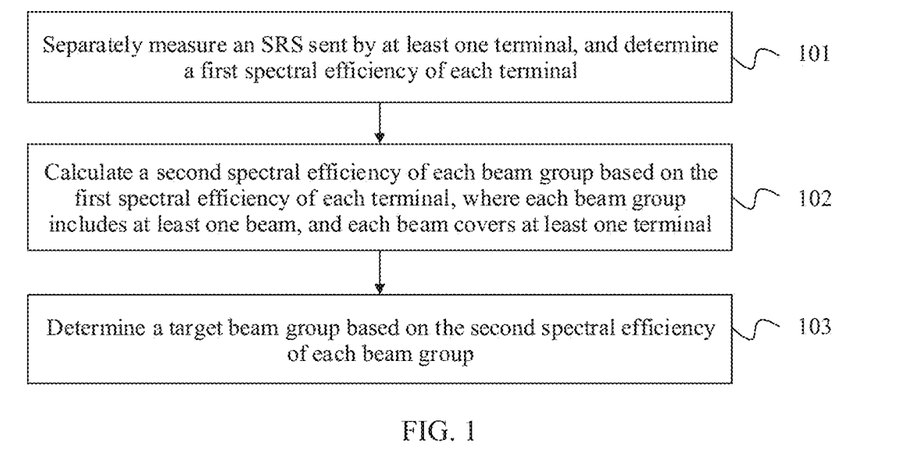
FIG. 1 is a schematic flowchart of a beam selection method according to Embodiment 1 of this application.
Figure 2:
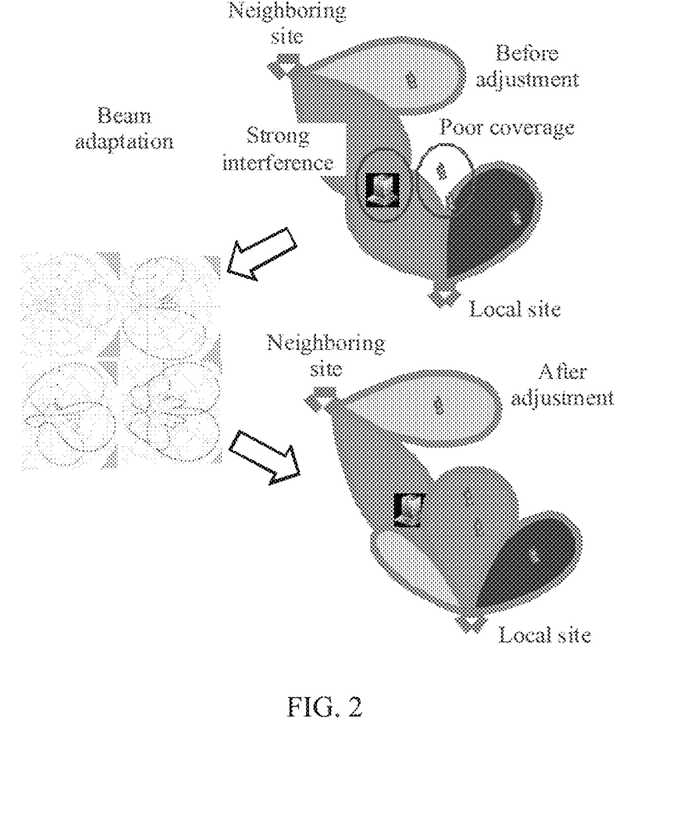
FIG. 2 is a schematic diagram of effects before and after multi-beam adjustment.

FIG. 1 is a schematic flowchart of a beam selection method according to Embodiment 1 of this application. As shown in FIG. 1, the beam selection method is provided in this embodiment of this application. The method may be performed by any apparatus that performs a beam selection method, and the apparatus may be implemented by using software and/or hardware. In this embodiment, the apparatus may be integrated into a network device. As shown in FIG. 2, the method in this embodiment may include the following steps.

Step 101. Separately measure an SRS sent by at least one terminal, to determine a first spectral efficiency of each terminal.

In this embodiment, it is assumed that there are a total of P physical channels for transmitting and receiving in a system, M beams are preset, and the M beams can achieve a complementary effect in terms of coverage.

A network device receives the sounding reference signal (SRS) sent by the at least one terminal, and measures at least one received uplink SRS signal, to determine the first spectral efficiency of each terminal. The at least one terminal includes a terminal in a local cell, a terminal in a neighboring site, a terminal at an edge of a neighboring cell, or the like.

In a possible implementation, that the network device measures an SRS sent by at least one terminal, to determine a first spectral efficiency of each terminal may be performed in the following manner: the SRS sent by each terminal in a local cell is separately measured, to determine an equivalent channel response that is of each first beam and that corresponds to the local cell; then a power level of each first beam is calculated based on the equivalent channel response of each first beam; and then the first spectral efficiency of each terminal in the local cell is determined based on the power level of each first beam.

Specifically, after the SRS sent by each terminal in the local cell is received, the received SRS is measured, to determine the equivalent channel response that is of each first beam and that corresponds to the local cell. In a specific implementation process, the equivalent channel response of each first beam may be determined according to a formula $$\begin{bmatrix} \vec{H}^0 \\ \vdots \\ \vec{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix}, \text{ where } \begin{bmatrix} H_0 \\ \vdots \\ H_{P-1} \end{bmatrix}$$

is a received channel response of P physical channels, $$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

is weights of multiple beams, $w_p^m$ indicates a weight coefficient of a first beam m on a channel p, m is an integer greater than 0 and less than or equal to M, M is a quantity of first beams, $[w_0^m \ldots w_{P-1}^m]$ is a weight vector of the first beam m on a used channel, and $$\begin{bmatrix} \vec{H}^0 \\ \vdots \\ \vec{H}^{M-1} \end{bmatrix}$$

indicates the equivalent channel response that is of each first beam and that is obtained through weighting processing.

After the equivalent channel response of each first beam is calculated, the power level of each first beam, that is, an equivalent power on each first beam, is calculated.

In a specific implementation process, the power level of each first beam may be calculated according to a formula $$\begin{bmatrix} P^0 \\ \vdots \\ P^{M-1} \end{bmatrix} = 10 * \log 10 \left( \begin{bmatrix} \|\vec{H}^0\| \\ \vdots \\ \|\vec{H}^{M-1}\| \end{bmatrix} \right) - E, \text{ where } \|\vec{H}^m\|$$

indicates a norm of an equivalent channel coefficient of the first beam m, $\|\vec{H}^m\| = \Sigma |h|^2$, h is a channel coefficient sequence, E indicates an uplink receive channel gain, 10*log 10( ) indicates a linear-to-logarithm conversion operation, and $P^m$ indicates an equivalent power level of the first beam m, where m is an integer greater than 0 and less than or equal to M, and M is a quantity of first beams.

Further, after calculating the power level of each first beam, the network device determines the first spectral efficiency of each terminal in the local cell based on the power level of each first beam. In a possible implementation, a serving beam and an interference beam of each terminal in the local cell may be separately determined, then a signal to interference plus noise ratio (SINR) of each terminal in the local cell may be calculated based on the serving beam and the interference beam, and the first spectral efficiency of each terminal in the local cell is determined based on each SINR.

Specifically, for each terminal, after calculating the power levels of the first beams, the network device selects a beam with a largest power level as the serving beam of the terminal, and uses another beam as the interference beam of the terminal. After the serving beam and the interference beam of the terminal are determined, the SINR is calculated, and the first spectral efficiency of the terminal is calculated according to the calculated SINR and a Shannon formula or a demodulation threshold table.

For example, a level difference between a serving beam and another interference beam in each beam group is calculated, the level difference is converted into an SINR, and the first spectral efficiency of each terminal is calculated according to the Shannon formula or the demodulation threshold table.

Step 102. Calculate a second spectral efficiency of each beam group based on the first spectral efficiency of each terminal, where each beam group includes at least one beam, and each beam covers at least one terminal.

In this embodiment, if M first beams are preset in a system, the first beams may be grouped based on coverage of the M first beams, to obtain a plurality of beam groups. Each beam group includes at least one beam, and each beam covers at least one terminal.

For example, beams whose beam coverage levels are not greater than a threshold S (for example, 10 dB) may be grouped into one group. Certainly, in actual application, the plurality of first beams may also be grouped according to another rule.

After determining the first spectral efficiencies of the plurality of terminals covered by each beam, the network device calculates the second spectral efficiency of each beam group based on the first spectral efficiencies.

In a possible implementation, a quantity of terminals covered by each beam in each beam group may be counted, and the second spectral efficiency $KE\Lambda\Lambda$ of each beam group may be calculated according to a formula $$KE\Lambda\Lambda = \sum_{i=0}^{M-1} \sum_{k=0}^{N^i-1} \frac{se(k)}{N^i}$$

or a formula $$KE\Lambda\Lambda = \sum_{i=0}^{M-1} \left( \frac{1}{N^i} \sum_{k=0}^{N^i-1} se(k) \right),$$

where $se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, and i is a positive integer greater than or equal to 0 and less than M−1.

Specifically, the network device may count a quantity of serving terminals on each first beam. In this way, the second spectral efficiency $KE\Lambda\Lambda$ of each beam group may be calculated according to the formula $$KE\Lambda\Lambda = \sum_{i=0}^{M-1} \sum_{k=0}^{N^i-1} \frac{se(k)}{N^i}$$

or the formula $$KE\Lambda\Lambda = \sum_{i=0}^{M-1} \left( \frac{1}{N^i} \sum_{k=0}^{N^i-1} se(k) \right),$$

where $se(k)$ is the first spectral efficiency of the $k^{th}$ terminal, and k is an integer greater than or equal to 0 and less than $N^i$, M is the quantity of first beams in each beam group, $N^i$ is the quantity of terminals covered by each first beam in each beam group, and i is a positive integer greater than or equal to 0 and less than M−1. In this way, a comprehensive capacity of spectral efficiency of each beam group, that is, the second spectral efficiency $KE\Lambda\Lambda$ of each beam group, can be calculated according to the foregoing formula, or the second spectral efficiency of each beam group is obtained by calculating an average value of the spectral efficiencies of the plurality of terminals covered by each first beam, and adding the average values of the spectral efficiencies corresponding to all the first beams in the beam groups.

In another possible implementation, when the second spectral efficiency of each beam group is calculated, a quantity of terminals covered by each first beam in each beam group may be further counted, a second beam covering a largest quantity of terminals in each beam group is determined, and a quantity of terminals covered by the second beam is obtained; and the second spectral efficiency $KE\Lambda\Lambda$ of each beam group is calculated according to a formula $$KE\Lambda\Lambda = \frac{\sum_{i=0}^{M-1} \sum_{k=0}^{N^i-1} se(k)}{N^x}.$$

$se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, i is a positive integer greater than or equal to 0 and less than M, and $N^x$ is the quantity of terminals covered by the second beam.

Specifically, the network device may count a quantity of serving terminals on each beam, select a second beam covering a largest quantity of serving terminals, and obtain a quantity of serving terminals $N^x$ covered by the second beam. In this way, the second spectral efficiency $KE\Lambda\Lambda$ of each beam group may be calculated according to the formula $$KE\Lambda\Lambda = \frac{\sum_{i=0}^{M-1} \sum_{k=0}^{N^i-1} se(k)}{N^x}.$$

For example, if a beam group includes a beam a, a beam b, and a beam c, and there are six served users on the beam a, that is, there are six terminals covered by the beam a, there are seven terminals covered by the beam b, and there are three terminals covered by the beam c, a second beam covering a largest quantity of terminals in the beam group is the beam b, and a quantity of terminals $N^x$ covered by the second beam is 7. In this way, the network device may calculate the second spectral efficiency of the beam group according to a formula $$KE\Lambda\Lambda = \frac{\sum_{i=0}^{M-1} \sum_{k=0}^{N^i-1} se(k)}{N^x}.$$

Step 103. Determine a target beam group based on the second spectral efficiency of each beam group.

In this embodiment, after calculating the second spectral efficiencies of the beam groups, the network device may determine the target beam group based on the second spectral efficiencies, where the determined target beam group is a beam group with optimal coverage.

In a possible implementation, after determining the second spectral efficiencies of the beam groups, the network device may sort the second spectral efficiencies of the beam groups in descending order, and select first p beam groups as the target beam group, where p is a positive integer.

In this embodiment, after determining the second spectral efficiencies of the beam groups in the foregoing manner, the network device compares the second spectral efficiencies of the beam groups, sorts the second spectral efficiencies in descending order, and selects the first p beam groups with a relatively high second spectral efficiency as the target beam group, where the p target beam groups are a beam group with optimal coverage.

In this application, based on channel reciprocity, multi-beam levels of uplink reference channels of a plurality of terminals are measured, and multi-beam level values are processed based on a given grouping relationship, to obtain a mutual interference level between multiple beams in each group, a spectral efficiency in a scenario of multi-beam spatial multiplexing, a user distribution proportion among the multiple beams, inter-site or inter-cell interference, and the like. Therefore, the beam group with optimal downlink coverage is determined based on the information, thereby improving the overall coverage effect.

In another possible implementation, after determining the second spectral efficiency of each beam group, the network device may alternatively determine the beam group whose second spectral efficiency is greater than a first preset threshold as the target beam group.

The first preset threshold may be set based on an actual situation or experience. A specific value of the first preset threshold is not limited herein in this embodiment of this application.

In still another possible implementation, after determining the second spectral efficiency of each beam group, the network device may determine distribution information of terminals covered by each beam group, select at least one first beam group whose distribution information falls within a preset range, and determine, as the target beam group, at least one second beam group that has a largest second spectral efficiency and that is in the at least one first beam group.

Specifically, after selecting the at least one first beam group whose distribution information of the terminals falls within the preset range, the network device selects the beam group with the largest second spectral efficiency from the at least one first beam group as the target beam group. In actual application, the network device may determine, by calculating a variance of a distribution quantity of terminals covered by each beam group, the distribution information of the terminals covered by each beam group, where if distribution information of terminals covered by a beam group falls within the preset range, it indicates that the terminals in the beam group are relatively evenly distributed. In addition, the preset range may be selected based on an actual situation or experience. A specific value of the preset range is not limited in this embodiment of this application.

Gains of downlink coverage beams may be evaluated based on a measurement result of an uplink SRS. Therefore, multiple beams can be adjusted, to improve spectral efficiency gains in a multi-beam coverage scenario.

Further, to prevent interference from a neighboring cell, a level of interference caused by each beam to the neighboring cell further needs to be calculated, a beam with largest interference is determined, and a beam group including the beam with the largest interference is not used as the target beam group. Specifically, the network device measures an SRS sent by at least one terminal in the neighboring cell, determines an equivalent channel response that is of each third beam and that corresponds to the neighboring cell, calculates a power level of each third beam based on the equivalent channel response of each third beam, determines a third beam with a largest power level, and determines a beam group including the third beam with the largest power level as a non-target beam group, or determines a beam group including a fourth beam with a power level greater than a second preset threshold as a non-target beam group.

A method in which the network device measures an SRS sent by at least one terminal in the neighboring cell, determines an equivalent channel response that is of each third beam and that corresponds to the neighboring cell, and calculates a power level of each third beam based on the equivalent channel response of each third beam is similar to the method for determining the equivalent channel response and the power level of each first beam corresponding to the local cell in step 101. Details are not described herein again.

After determining the power levels that are of the third beams and that correspond to the neighboring cell, the network device determines the third beam with the largest power level, where the third beam with the largest power level is a third beam with largest interference. In this case, the network device may exclude the beam group including the third beam with the largest power level, to be specific, determine the beam group as a non-target beam group.

The beam group including the third beam with the largest interference is determined as the non-target beam group. In this way, because inter-site or inter-cell interference is considered, a downlink optimal coverage beam group may be determined, thereby improving an overall coverage effect.

In addition, after determining the power levels that are of the third beams and that correspond to the neighboring cell, the network device determines the fourth beam whose power level is greater than the second preset threshold, where the fourth beam whose power level is greater than the second preset threshold is a beam with relatively strong interference. In this case, the network device may exclude the beam group including the fourth beam, to be specific, determine the beam group as a non-target beam group.

The beam group including the fourth beam with the relatively strong interference is determined as the non-target beam group. In this way, because inter-site or inter-cell interference is considered, a downlink optimal coverage beam group may be determined, thereby improving an overall coverage effect.

FIG. 2 is a schematic diagram of effects before and after multi-beam adjustment. As shown in FIG. 2, before the multi-beam adjustment, interference between beams is relatively strong, and beam coverage is relatively poor. After the multi-beam adjustment is performed in the manner in FIG. 1, a beam group with optimal downlink coverage may be determined, to reduce the interference between the beams and improve an overall coverage effect.

This embodiment of the present invention provides a beam selection method. A network device separately measures a sounding reference signal (SRS) sent by at least one terminal, to determine a first spectral efficiency of each terminal; calculates a second spectral efficiency of each beam group based on the first spectral efficiency of each terminal, where each beam group includes at least one beam, and each beam covers at least one terminal; and determines a target beam group based on the second spectral efficiency of each beam group. After measuring the SRS, the network device determines the first spectral efficiency of each terminal, and calculates the second spectral efficiency of each beam group based on the first spectral efficiency, to determine the target beam group. In this way, the network device can determine inter-cell interference based on the second spectral efficiency of each beam group, so that an optimal coverage beam group can be determined, thereby increasing a split gain, improving a network capacity expansion effect, and improving an overall coverage effect.

Figure 3:
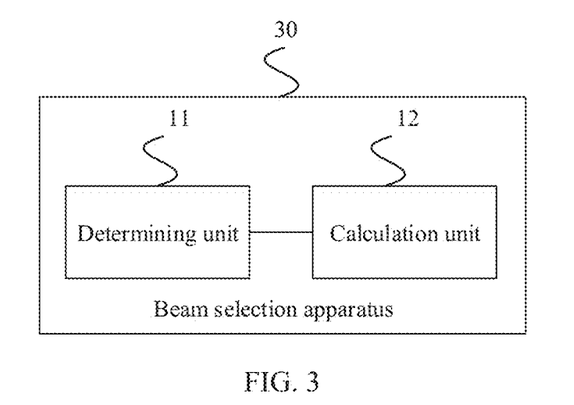
FIG. 3 is a schematic structural diagram of a beam selection apparatus 30 according to an embodiment of this application.

FIG. 3 is a schematic structural diagram of a beam selection apparatus 30 according to an embodiment of this application. Referring to FIG. 3, the beam selection apparatus 30 may include:

a determining unit 11, configured to separately measure a sounding reference signal SRS sent by at least one terminal, to determine a first spectral efficiency of each terminal; and a calculation unit 12, configured to calculate a second spectral efficiency of each beam group based on the first spectral efficiency of each terminal, where each beam group includes at least one beam, and each beam covers at least one terminal, where the determining unit 11 is further configured to determine a target beam group based on the second spectral efficiency of each beam group.

Optionally, the determining unit 11 is specifically configured to:

separately measure the SRS sent by each terminal in a local cell, to determine an equivalent channel response that is of each first beam and that corresponds to the local cell;

calculate a power level of each first beam based on the equivalent channel response of each first beam; and determine the first spectral efficiency of each terminal in the local cell based on the power level of each first beam.

Optionally, the determining unit 11 is specifically configured to:

separately determine a serving beam and an interference beam of each terminal in the local cell;

calculate a signal to interference plus noise ratio (SINR) of each terminal in the local cell based on the serving beam and the interference beam; and determine the first spectral efficiency of each terminal in the local cell based on each SINR.

Optionally, the calculation unit 12 is specifically configured to:

count a quantity of terminals covered by each first beam in each beam group; and calculate the second spectral efficiency $KE\Lambda\Lambda$ of each beam group according to a formula $$KE\Lambda\Lambda = \sum_{i=0}^{M-1} \sum_{k=0}^{N^i-1} \frac{se(k)}{N^i}$$

or a formula $$KE\Lambda\Lambda = \sum_{i=0}^{M-1} \left( \frac{1}{N^i} \sum_{k=0}^{N^i-1} se(k) \right),$$

where $se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, and i is a positive integer greater than or equal to 0 and less than M−1.

Optionally, the calculation unit 12 is specifically configured to:

count a quantity of terminals covered by each first beam in each beam group;

determine a second beam covering a largest quantity of terminals in each beam group, and obtain a quantity of terminals covered by the second beam; and calculate the second spectral efficiency $KE\Lambda\Lambda$ of each beam group according to a formula $$KE\Lambda\Lambda = \frac{\sum_{i=0}^{M-1} \sum_{k=0}^{N^i-1} se(k)}{N^x},$$

where $se(k)$ is a first spectral efficiency of a $k^{th}$ terminal, k is an integer greater than or equal to 0 and less than $N^i$, M is a quantity of first beams in each beam group, $N^i$ is the quantity of terminals covered by each first beam in each beam group, i is a positive integer greater than or equal to 0 and less than M, and $N^x$ is the quantity of terminals covered by the second beam.

Optionally, the determining unit 11 is specifically configured to:

determine distribution information of terminals covered by each beam group;

select at least one first beam group whose distribution information falls within a preset range; and determine, as the target beam group, a second beam group that has a largest second spectral efficiency and that is in the at least one first beam group.

Optionally, the determining unit 11 is specifically configured to:

sort the second spectral efficiencies of the beam groups in descending order, and select first p beam groups as the target beam group, where p is a positive integer; or determine a beam group whose second spectral efficiency is greater than a first preset threshold as the target beam group.

Optionally, the determining unit 11 is specifically configured to:

determine the equivalent channel response of each first beam according to a formula $$\begin{bmatrix} \vec{H}^0 \\ \vdots \\ \vec{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix}, \text{ where } \begin{bmatrix} H_0 \\ \vdots \\ H_{P-1} \end{bmatrix}$$

is a received channel response of P physical channels, $$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

is weights of multiple beams, $w_p^m$ indicates a weight coefficient of a first beam m on a channel p, $[w_0^m \ldots w_{P-1}^m]$ is a weight vector of the first beam m on a used channel, and $$\begin{bmatrix} \vec{H}^0 \\ \vdots \\ \vec{H}^{M-1} \end{bmatrix}$$

indicates the equivalent channel response that is of each first beam and that is obtained through weighted processing.

Optionally, the calculation unit 12 is specifically configured to:

calculate the power level of each first beam according to a formula $$\begin{bmatrix} P^0 \\ \vdots \\ P^{M-1} \end{bmatrix} = 10*\log 10 \left( \begin{bmatrix} \|\vec{H}^0\| \\ \vdots \\ \|\vec{H}^{M-1}\| \end{bmatrix} \right) - E, \text{ where } \|\vec{H}^m\|$$

indicates a norm of an equivalent channel coefficient of the first beam m, $\|\vec{H}^m\| = \Sigma |h|^2$, h is a channel coefficient sequence, E indicates an uplink receive channel gain, 10*log 10( ) indicates a linear-to-logarithm conversion operation, and $P^m$ indicates an equivalent power level of the first beam m.

Optionally, the determining unit 11 is further configured to measure an SRS sent by at least one terminal in a neighboring cell, to determine an equivalent channel response that is of each third beam and that corresponds to the neighboring cell;

the calculation unit 12 is further configured to calculate a power level of each third beam based on the equivalent channel response of each third beam; and the determining unit 11 is further configured to: determine a third beam with a largest power level, and determine a beam group including the third beam with the largest power level as a non-target beam group, or determine a beam group including a fourth beam with a power level greater than a second preset threshold as a non-target beam group.

Figure 4:
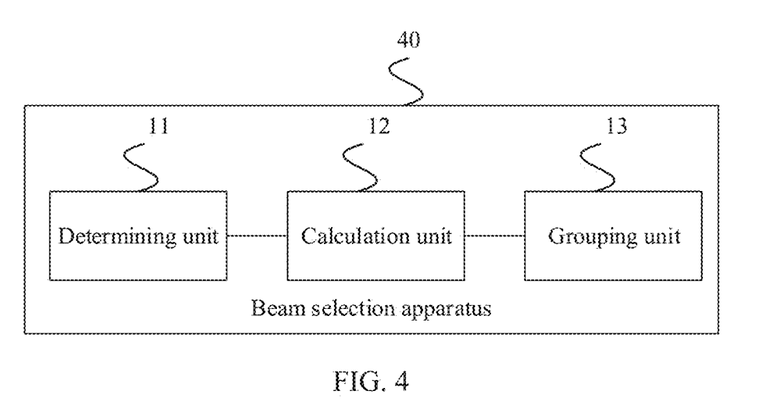
FIG. 4 is another schematic structural diagram of a beam selection apparatus 40 according to an embodiment of this application.

FIG. 4 is another schematic structural diagram of a beam selection apparatus 40 according to an embodiment of this application. Based on the embodiment shown in FIG. 3, the apparatus further includes a grouping unit 13.

The grouping unit 13 is configured to group a plurality of first beams based on coverage of the plurality of first beams, to obtain a plurality of beam groups.

The beam selection apparatus shown in this embodiment of this application may perform the technical solution of the beam selection method shown in any one of the foregoing embodiments. Implementation principles and beneficial effects of the beam selection apparatus are similar to those of the beam selection method. Details are not described herein again.

It should be noted that, it should be understood that, the division of the units of the apparatus is merely logical function division. In actual implementation, all or some of the units may be integrated into a physical entity, or the units may be physically separate. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, a sending unit may be an independently disposed processing element, or may be integrated into a chip of the network device for implementation. In addition, the sending unit may also be stored in a memory of the network device in a form of a program, and a processing element of the network device invokes and executes a function of the sending unit. Implementation of other units is similar. In addition, all or some of the units may be integrated together, or may be implemented independently. The processing element described herein may be an integrated circuit with a signal processing capability. In an implementation process, steps of the foregoing method or the foregoing units may be implemented by using an integrated logical circuit of hardware in the processor element, or by using an instruction in a form of software. In addition, the sending unit is a sending control unit, and may send information through a transmit apparatus of the network device, such as an antenna and a radio frequency apparatus.

The foregoing units may be one or more integrated circuits configured to perform the foregoing method, for example, one or more application-specific integrated circuits (ASIC), one or more microprocessors (DSP), or one or more field programmable gate arrays (FPGA). For another example, when one of the foregoing units is implemented by a processing element scheduling a program, the processing element may be a general-purpose processor, for example, a central processing unit (CPU) or another processor that can invoke a program. For still another example, the units may be integrated and implemented in a form of a system-on-a-chip (SOC).

Figure 5:
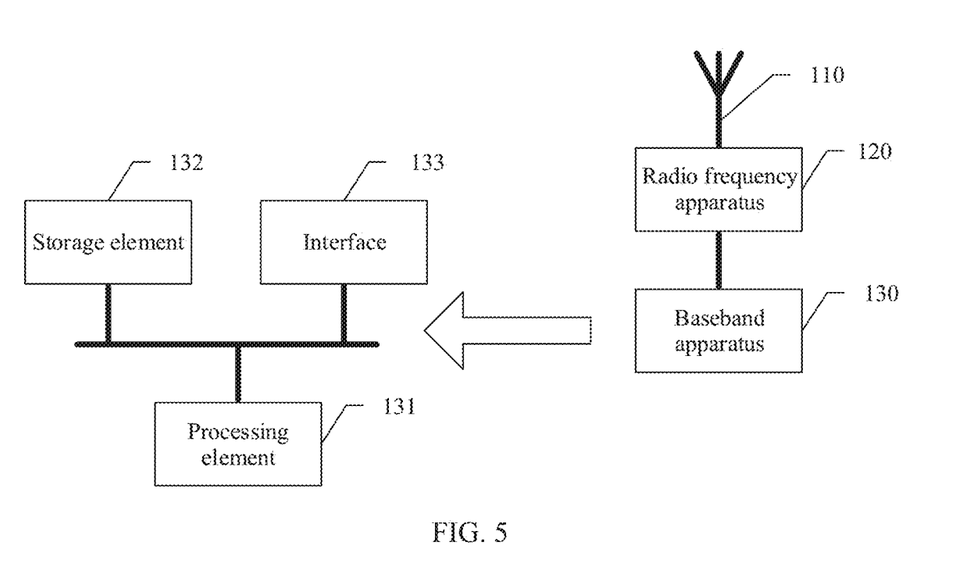
FIG. 5 is a schematic structural diagram of a network device according to an embodiment of this application.

FIG. 5 is a schematic structural diagram of a network device according to an embodiment of this application. As shown in FIG. 5, the network device includes an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal device, and sends, to the baseband apparatus 130 for processing, the information sent by the terminal device. In a downlink direction, the baseband apparatus 130 processes information of a terminal device, and sends the information to the radio frequency apparatus 120. The radio frequency apparatus 120 processes the information of the terminal device, and then sends the processed information to the terminal device through the antenna 110.

In an implementation, the foregoing units are implemented in a form of a processing element scheduling a program. For example, the baseband apparatus 130 includes a processing element 131 and a storage element 132, and the processing element 131 invokes a program stored in the storage element 132, to perform the method in the foregoing method embodiment. In addition, the baseband apparatus 130 may further include an interface 133, configured to exchange information with the radio frequency apparatus 120. The interface is, for example, a common public radio interface (CPRI).

In another implementation, the foregoing units may be one or more processing elements configured to perform the foregoing method, and these processing elements are disposed on the baseband apparatus 130. The processing elements herein may be integrated circuits, for example, one or more ASICs, one or more DSPs, or one or more FPGAs. These integrated circuits may be integrated together to form a chip.

For example, the foregoing modules may be integrated together and implemented in a form of a system-on-a-chip (SOC). For example, the baseband apparatus 130 includes an SOC chip, configured to implement the foregoing method. The processing element 131 and the storage element 132 may be integrated into the chip, and the processing element 131 invokes the program stored in the storage element 132, to implement the foregoing method or functions of the foregoing units. Alternatively, at least one integrated circuit may be integrated in the chip to implement the foregoing method or functions of the foregoing units. Alternatively, with reference to the foregoing implementations, functions of some units are implemented in a form of a processing element invoking a program, and functions of some units are implemented in a form of an integrated circuit.

Regardless of a manner, the foregoing network device includes at least one processing element, a storage element, and a communications interface, and the at least one processing element is configured to perform the method according to the foregoing method embodiment. The processing element may perform some or all of the steps in the foregoing method embodiment in a first manner, that is, in a manner of executing the program stored in the storage element, or in a second manner, that is, in a manner of using an integrated logic circuit of hardware in the processor element in combination with an instruction. Certainly, the method according to the foregoing method embodiment may also be performed in combination with the first manner and the second manner.

As described above, the processing element herein may be a general-purpose processor, for example, a central processing unit (CPU), or may be one or more integrated circuits configured to perform the foregoing method, for example, one or more application-specific integrated circuits (ASIC), one or more microprocessors (DSP), or one or more field programmable gate arrays (FPGA).

The storage element may be one memory, or may be a general term of a plurality of storage elements.

This application further provides a storage medium, including a readable storage medium and a computer program. The computer program is used to implement the beam selection method according to any one of the foregoing embodiments.

This application further provides a program product, where the program product includes a computer program (that is, an executable instruction), and the computer program is stored in a readable storage medium. At least one processor of a network device may read the computer program from the readable storage medium, and the at least one processor executes the computer program, so that the network device implements the beam selection method according to the foregoing implementations.

An embodiment of this application further provides a beam selection apparatus, including at least one storage element and at least one processing element. The at least one storage element is configured to store a program, and when the program is executed, the beam selection apparatus is enabled to perform an operation of the network device in any one of the foregoing embodiments.

All or some of the steps of the method embodiment may be implemented by a program instructing related hardware. The foregoing program may be stored in a readable memory. When the program is executed, the steps of the foregoing method embodiments are performed. The foregoing memory (storage medium) includes: a read-only memory (ROM), a RAM, a flash memory, a hard disk, a solid-state drive, a magnetic tape, a floppy disk, an optical disc, or any combination thereof.

What is claimed is:

1. A method comprising:
measuring a sounding reference signals (SRS) sent by each terminal of at least one terminal, to determine a first spectral efficiency of each terminal of the at least one terminal;
calculating a second spectral efficiency of each beam group of a plurality of beam groups based on the first spectral efficiency of each terminal, wherein each beam group comprises at least one first beam, and the at least one first beam covers one or more terminals of the at least one terminal, the second spectral efficiency of each beam group being calculated using a quantity of terminals covered by a beam of each beam group; and
determining a target beam group from the plurality of beam groups based on the second spectral efficiency of each beam group.

2. The method according to claim 1, wherein measuring the SRS sent by each terminal of the at least one terminal, to determine the first spectral efficiency of each terminal of the at least one terminal comprises:
measuring the SRS sent by each terminal in a local cell, to determine an equivalent channel response that is of each first beam and that corresponds to the local cell;
calculating a power level of each first beam based on the equivalent channel response of each first beam; and
determining the first spectral efficiency of each terminal in the local cell based on the power level of each first beam.

3. The method according to claim 2, wherein determining the first spectral efficiency of each terminal in the local cell based on the power level of each first beam comprises:
determining a serving beam and an interference beam of each terminal in the local cell;
calculating a signal to interference plus noise ratio (SINR) of each terminal in the local cell based on the serving beam and the interference beam; and
determining the first spectral efficiency of each terminal in the local cell based on the SINR.

4. The method according to claim 2, wherein measuring the SRS sent by each terminal in the local cell, to determine the equivalent channel response of each first beam comprises:
determining the equivalent channel response of each first beam according to a formula $$\begin{bmatrix} \vec{H}^0 \\ \vdots \\ \vec{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix}, \text{wherein } \begin{bmatrix} H_0 \\ \vdots \\ H_{P-1} \end{bmatrix}$$

is a received channel response of P physical channels, $$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

is weights of M beams, M is an integer greater than 1, $w_p^m$ indicates a weight coefficient of an $m^{th}$ first beam on a $p^{th}$ physical channel, $[w_0^m \ldots w_{P-1}^m]$ is a weight vector of the $m^{th}$ first beam on a used channel, and $$\begin{bmatrix} \vec{H}^0 \\ \vdots \\ \vec{H}^{M-1} \end{bmatrix}$$

indicates the equivalent channel response that is of each first beam and that is obtained through weighted processing.

5. The method according to claim 2, wherein calculating the power level of each first beam based on the equivalent channel response of each first beam comprises:

calculating the power level of each first beam according to a formula $$\begin{bmatrix} p^0 \\ \vdots \\ p^{M-1} \end{bmatrix} = 10*\log10\left(\begin{bmatrix} \|\vec{H}^0\| \\ \vdots \\ \|\vec{H}^{M-1}\| \end{bmatrix}\right) - E, \text{ wherein } \|\vec{H}^m\|$$

indicates a norm of an equivalent channel coefficient of an $m^{th}$ first beam of M first beams, M is an integer greater than 1, $\|\vec{H}^m\| = \Sigma |h|^2$, h is a channel coefficient sequence, E indicates an uplink receive channel gain, $10*\log 10()$ indicates a linear-to-logarithm conversion operation, and $p^m$ indicates an equivalent power level of the $m^{th}$ first beam.

6. The method according to claim 1, wherein calculating the second spectral efficiency of each beam group based on the first spectral efficiency of each terminal comprises:
for each beam group of the plurality of beam groups:
counting a quantity of terminals covered by each first beam in a beam group; and
calculating the second spectral efficiency KEΛΛ of the beam group according to a formula $$KE\Lambda\Lambda = \sum_{i=0}^{M-1} \sum_{k=0}^{N^i-1} \frac{se(k)}{N^i}$$

or a formula $$KE\Lambda\Lambda = \sum_{i=0}^{M-1} \left(\frac{1}{N^i} \sum_{k=0}^{N^i-1} se(k)\right),$$

wherein se(k) is the first spectral efficiency of a $k^{th}$ terminal covered by a first beam in the beam group, k is an integer greater than or equal to 0 and less than $N^i$, M is a quantity of first beams in the beam group, $N^i$ is a quantity of terminals covered by an $i^{th}$ first beam in the beam group, and i is a positive integer greater than or equal to 0 and less than M.

7. The method according to claim 1, wherein calculating the second spectral efficiency of each beam group based on the first spectral efficiency of each terminal comprises:
for each beam group of the plurality of beam groups:
counting a quantity of terminals covered by each first beam in a beam group;
determining a second beam in the beam group that covers a largest quantity of terminals among first beams in the beam group, and obtaining a quantity of terminals covered by the second beam; and
calculating the second spectral efficiency KEΛΛ of the beam group according to a formula $$KE\Lambda\Lambda = \frac{\sum_{i=0}^{M-1} \sum_{k=0}^{N^i-1} se(k)}{N^x},$$

wherein se(k) is the first spectral efficiency of a $k^{th}$ terminal covered by a first beam in the beam group, k is an integer greater than or equal to o and less than $N^i$, M is a quantity of the first beams in the beam group, $N^i$ is a quantity of terminals covered by an $i^{th}$ first beam in the beam group, i is a positive integer greater than or equal to 0 and less than M, and $N^x$ is a quantity of terminals covered by the second beam.

8. The method according to claim 1, wherein determining the target beam group comprises:
determining distribution information of terminals covered by each beam group;
selecting at least one first beam group whose distribution information falls within a preset range; and
determining, as the target beam group, a second beam group that has a largest second spectral efficiency among the at least one first beam group.

9. The method according to claim 1, wherein determining the target beam group comprises:
sorting second spectral efficiencies of the plurality of beam groups in a descending order, and selecting first p beam groups from the plurality of beam groups as the target beam group, wherein p is a positive integer; or
determining a beam group whose second spectral efficiency is greater than a first preset threshold as the target beam group.

10. The method according to claim 1, further comprising:
measuring a second SRS sent by each of at least one terminal in a neighboring cell, to determine a second equivalent channel response that is of each third beam and that corresponds to the neighboring cell;
calculating a power level of each third beam based on the second equivalent channel response of each third beam; and
determining a fourth beam with a largest power level among third beams receiving second SRSs sent by the at least one terminal in the neighboring cell, and determining a beam group comprising the fourth beam with the largest power level as a non-target beam group, or determining a beam group comprising a fifth beam with a power level greater than a second preset threshold as the non-target beam group.

11. The method according to claim 1, further comprising:
grouping a plurality of first beams based on coverage of the plurality of first beams, to obtain the plurality of beam groups.

12. An apparatus comprising:
a non-transitory memory storage comprising instructions; and
one or more processors in communication with the memory storage, wherein the instructions, when executed by the one or more processors, cause the apparatus to:
measure a sounding reference signal (SRS) sent by each terminal of at least one terminal, to determine a first spectral efficiency of each terminal of the at least one terminal;
calculate a second spectral efficiency of each beam group of a plurality of beam groups based on the first spectral efficiency of each terminal, wherein each beam group comprises at least one first beam, and the at least one first beam covers one or more terminals of the at least one terminal, the second spectral efficiency of each beam group being calculated using a quantity of terminals covered by a beam of each beam group; and
determine a target beam group from the plurality of beam groups based on the second spectral efficiency of each beam group.

13. The apparatus according to claim 12, wherein the instructions, when executed by the one or more processors, cause the apparatus further to:

measure the SRS sent by each terminal in a local cell, to determine an equivalent channel response that is of each first beam and that corresponds to the local cell;
calculate a power level of each first beam based on the equivalent channel response of each first beam; and
determine the first spectral efficiency of each terminal in the local cell based on the power level of each first beam.

14. The apparatus according to claim 13, wherein the instructions, when executed by the one or more processors, cause the apparatus further to:
determine a serving beam and an interference beam of each terminal in the local cell;
calculate a signal to interference plus noise ratio (SINR) of each terminal in the local cell based on the serving beam and the interference beam; and
determine the first spectral efficiency of each terminal in the local cell based on the SINR.

15. The apparatus according to claim 13, wherein the instructions, when executed by the one or more processors, cause the apparatus further to:
determine the equivalent channel response of each first beam according to a formula $$\begin{bmatrix} \vec{H}^0 \\ \vdots \\ \vec{H}^{M-1} \end{bmatrix} = \begin{bmatrix} w_0^0 & \cdots & w_{P-1}^0 \\ \vdots & \ddots & \vdots \\ w_0^{M-1} & \cdots & w_{P-1}^{M-1} \end{bmatrix} * \begin{bmatrix} H_0 \\ \vdots \\ H_{P-1} \end{bmatrix}, \text{wherein} \begin{bmatrix} H_0 \\ \vdots \\ H_{P-1} \end{bmatrix}$$

is a received channel response of P physical channels, $$\begin{bmatrix} w_0^0 & \cdots & w_{P-1}^0 \\ \vdots & \ddots & \vdots \\ w_0^{M-1} & \cdots & w_{P-1}^{M-1} \end{bmatrix}$$

is weights of M beams, M is an integer greater than 1, $w_p^m$ indicates a weight coefficient of an $m^{th}$ first beam on a $p^{th}$ physical channel, $[w_0^m \ldots w_{P-1}^m]$ is a weight vector of the $m^{th}$ first beam on a used channel, and $$\begin{bmatrix} \vec{H}^0 \\ \vdots \\ \vec{H}^{M-1} \end{bmatrix}$$

indicates the equivalent channel response that is of each first beam and that is obtained through weighted processing.

16. The apparatus according to claim 13, wherein the instructions, when executed by the one or more processors, cause the apparatus further to:
calculate the power level of each first beam according to a formula $$\begin{bmatrix} p^0 \\ \vdots \\ p^{M-1} \end{bmatrix} = 10 * \log 10 \begin{pmatrix} \|\vec{H}^0\| \\ \vdots \\ \|\vec{H}^{M-1}\| \end{pmatrix} - E, \text{wherein } \|\vec{H}^m\|$$

indicates a norm of an equivalent channel coefficient of an $m^{th}$ first beam of M first beams, M is an integer greater than 1, $\|\vec{H}^m\| = \Sigma|h|^2$, h is a channel coefficient sequence, E indicates an uplink receive channel gain, 10*log 10( ) indicates a linear-to-logarithm conversion operation, and $p^m$ indicates an equivalent power level of the $m^{th}$ first beam.

17. The apparatus according to claim 12, wherein the instructions, when executed by the one or more processors, cause the apparatus further to:
for each beam group of the plurality of beam groups:
count a quantity of terminals covered by each first beam in a beam group; and
calculate the second spectral efficiency KEΛΛ of the beam group according to a formula $$KE\Lambda\Lambda = \sum_{i=0}^{M-1} \sum_{k=0}^{N^i-1} \frac{se(k)}{N^i}$$

or a formula $$KE\Lambda\Lambda = \sum_{i=0}^{M-1} \left( \frac{1}{N^i} \sum_{k=0}^{N^i-1} se(k) \right),$$

wherein se(k) is the first spectral efficiency of a $k^{th}$ terminal covered by a first beam in the beam group, k is an integer greater than or equal to 0 and less than $N^i$, M is a quantity of first beams in the beam group, $N^i$ is a quantity of terminals covered by an $i^{th}$ first beam in the beam group, and i is a positive integer greater than or equal to 0 and less than M−1.

18. The apparatus according to claim 12, wherein the instructions, when executed by the one or more processors, cause the apparatus further to:
for each beam group of the plurality of beam groups:
count a quantity of terminals covered by each first beam in a beam group;
determine a second beam in the beam group that covers a largest quantity of terminals among first beams in the beam group, and obtain a quantity of terminals covered by the second beam; and
calculate the second spectral efficiency KEΛΛ of the beam group according to a formula $$KE\Lambda\Lambda = \frac{\sum_{i=0}^{M-1} \sum_{k=0}^{N^i-1} se(k)}{N^x},$$

wherein se(k) is the first spectral efficiency of a $k^{th}$ terminal covered by a first beam in the beam group, k is an integer greater than or equal to 0 and less than $N^i$, M is a quantity of the first beams in the beam group, $N^i$ is a quantity of terminals covered by an $i^{th}$ first beam in the beam group, i is a positive integer greater than or equal to 0 and less than M, and $N^x$ is a quantity of terminals covered by the second beam.

19. The apparatus according to claim 12, wherein the instructions, when executed by the one or more processors, cause the apparatus further to:
determine distribution information of terminals covered by each beam group;
select at least one first beam group whose distribution information falls within a preset range; and
determine, as the target beam group, a second beam group that has a largest second spectral efficiency among the at least one first beam group.

20. The apparatus according to claim 12, wherein the instructions, when executed by the one or more processors, cause the apparatus further to:
- sort second spectral efficiencies of the plurality of beam groups in a descending order, and select first p beam groups from the plurality of beam groups as the target beam group, wherein p is a positive integer; or
- determine a beam group whose second spectral efficiency is greater than a first preset threshold as the target beam group.

* * * * *

UNITED STATES PATENT AND TRADEMARK OFFICE
CERTIFICATE OF CORRECTION

PATENT NO. : 11,606,227 B2
APPLICATION NO. : 17/131307
DATED : March 14, 2023
INVENTOR(S) : Zhang It is certified that error appears in the above-identified patent and that said Letters Patent is hereby corrected as shown below:

In the Claims

Claim 7, Column 23, Line 65; delete "o" and insert --0--.

Signed and Sealed this
Eleventh Day of April, 2023

Katherine Kelly Vidal
*Director of the United States Patent and Trademark Office*